United States Patent Office 3,346,716
Patented Oct. 10, 1967

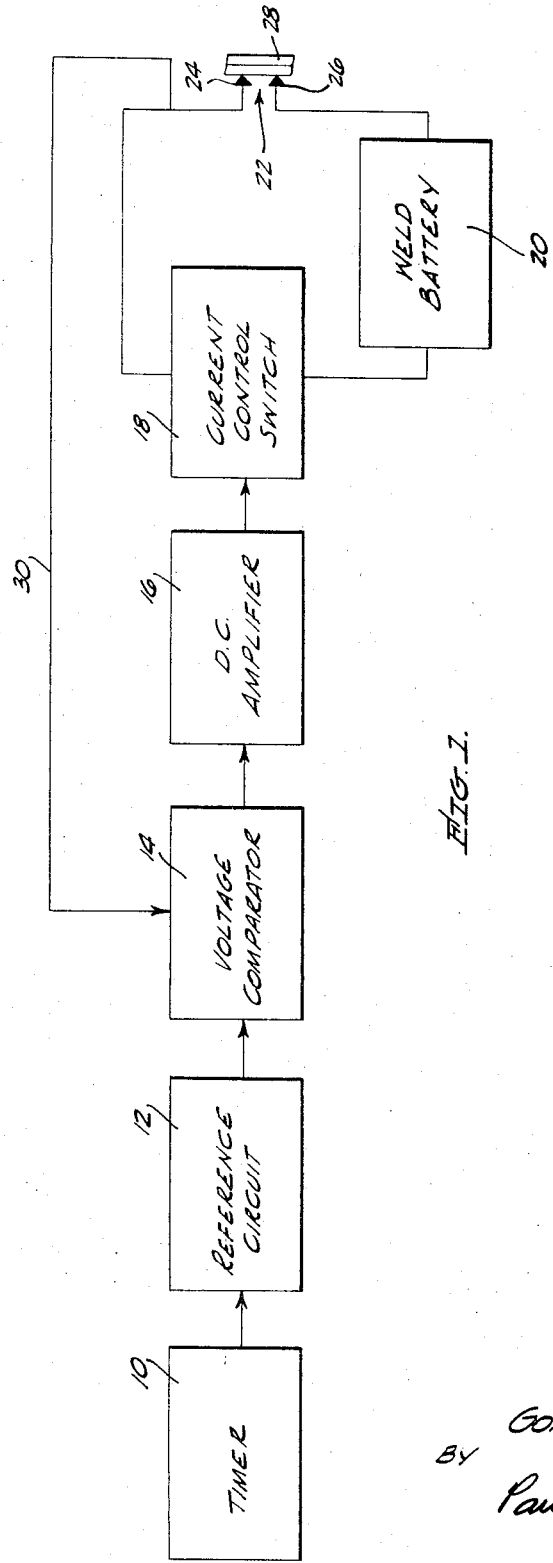

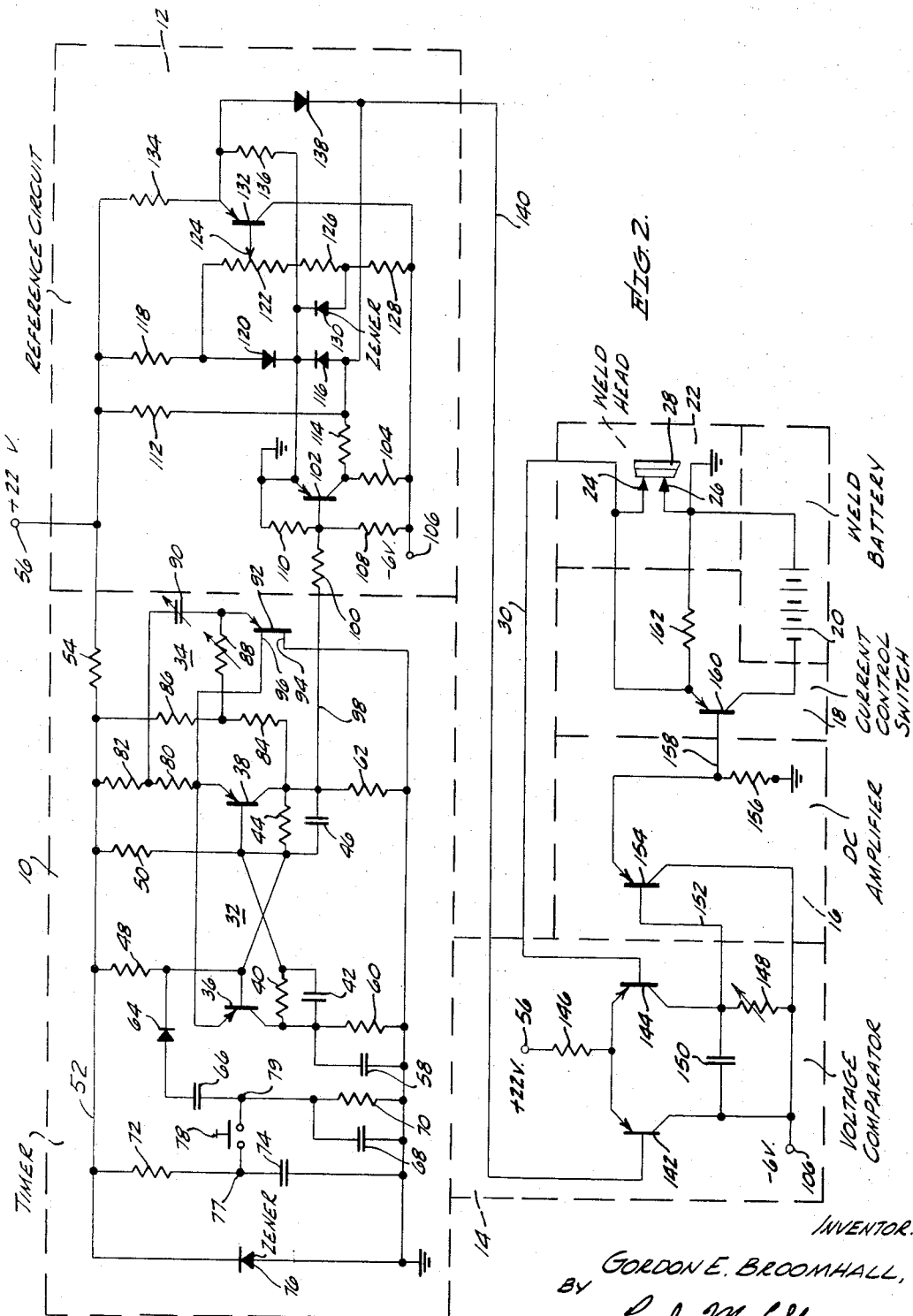

3,346,716
WELDING CONTROL CIRCUIT
Gordon E. Broomhall, Escondido, Calif., assignor to Hughes Aircraft Company, Culver City, Calif., a corporation of Delaware
Filed Mar. 20, 1964, Ser. No. 353,501
7 Claims. (Cl. 219—110)

ABSTRACT OF THE DISCLOSURE

In the disclosed welding control circuit the emitter-collector path of a switching transistor and a battery are connected in series between a pair of parallel-gap welding electrodes. The transistor receives a control voltage determined by the difference between a reference voltage, generated during a welding timing interval, and a feedback voltage indicative of the welding electrode voltage. During the welding timing interval, the transistor is maintained conductive to permit the flow of welding current at a level such that the welding electrode voltage is maintained equal to the reference voltage.

---

The present invention relates to parallel-gap welding, and more particularly relates to a control circuit for supplying constant voltage welding pulses of readily controllable amplitude and duration to a parallel-gap welding head.

Parallel-gap welding techniques, in which current flows in parallel branches across a fixed electrode gap, are particularly useful in the welding of narrow conductors such as ribbon microcircuit leads and printed circuit conductors. However, when conventional welder power supplies which furnish constant current pulses to the welding electrodes are used to drive a parallel-gap welding head, the power density undergoes significant variation as a function of the cross-sectional area of the conductors being welded. Specifically, for a given current level, a conductor of smaller cross-section will receive more power than a conductor of larger cross-section so that an adjustment of the current level is required to compensate for network conductors whose resistances differ on account of different cross-sections.

In order to eliminate these undesirable changes in power density as a function of conductor cross-section, welding power supplies have been developed in which an AC measuring signal is applied to the welding electrodes in order to sample the welding electrode gap voltage. The sampled gap voltage is then compared with a reference voltage, and the resulting error voltage drives a variable shunt which diverts current from a capacitance discharge supply away from a welding transformer which drives the welding electrodes in order to vary the current flowing through the welding transformer and the welding electrodes. While such a welding control circuit is able to compensate for changes in the resistance of the conductors being welded, the circuit is quite complex and expensive, and in addition it does not afford a ready control over the weld pulse duration.

Accordingly, it is an object of the present invention to provide a welding control circuit which supplies constant voltage pulses of readily controllable magnitude to a weld head, and at the same time which circuit is much simpler and less expensive than in the prior art.

It is a further object of the present invention to provide a welding control circuit which, in addition to possessing the advantages set forth above, is readily programable to provide welding pulses of controllable duration as well as amplitude.

It is a still further object of the present invention to provide a power supply circuit especially suitable for use with a parallel-gap weld head which, in addition to providing rectangularly shaped and accurately reproducible welding pulses of relatively high current, automatically controls the current level of the welding pulses in order to compensate for changes in the cross-sectional area of the work being welded.

In accordance with the objects outlined above, the welding control circuit of the present invention includes a battery and an electronically controllable switching device, such as a transistor, connected in series between first and second welding electrodes. Timing means generates a timing signal of a preselected controllable duration, and reference means responsive to the timing means provides a reference voltage of a preselected controllable magnitude during the duration of the timing signal. A comparator compares the reference voltage with a feedback voltage indicative of the voltage between the first and second welding electrodes and provides a control signal indicative of the difference between the reference voltage and the feedback voltage. The control signal is applied to the switching device to maintain the device conductive of current so that a current path is established between the battery and the welding electrodes during the duration of the timing signal, with the feedback loop regulating the level of welding current so that the voltage between the first and second welding electrodes is maintained essentially equal to the reference voltage.

Additional objects, advantages, and characteristic features of the present invention will become readily apparent from the following detailed description of a preferred embodiment of the invention when taken in conjunction with the accompanying drawing in which:

FIG. 1 is a block diagram illustrating a welding control circuit in accordance with the principles of the invention; and FIG. 2 is a schematic circuit diagram of a preferred embodiment of the circuit of FIG. 1.

Referring to FIG. 1 with more particularity, the welding control circuit of the present invention may be seen to include a timer 10 which generates output pulses of preselected variable duration so that the duration of the flow of welding current may be readily controlled. The output signals from the timer 10 are fed to a reference circuit 12 which provides a reference voltage of a preselected readily controllable magnitude in accordance with the desired welding voltage. The output voltage from the reference circuit 12 is applied to one input of a voltage comparator 14, the other input to which receives a feedback signal indicative of the voltage across the welding electrodes. The voltage comparator 14 compares the welding electrode fedeback voltage with the reference voltage and provides a control signal indicative of the difference between the reference voltage and the feedback voltage. After being amplified in a DC amplifier 16, the control signal is applied to an electronically controllable variable impedance switch 18 which controls the flow of welding current. The current path of the weld current control switch 18 is connected in series with a weld battery 20 and a weld head 22 including a pair of welding electrodes 24 and 26 adapted to contact the work 28 to be welded. The voltage appearing between the welding electrodes 24 and 26 is fed back via a lead 30 to the voltage comparator 14 for comparison with the reference circuit voltage.

In the absence of a timing signal from the timer 10, the reference circuit 12 provides a reference voltage of a magnitude which maintains the weld current control switch 18 in an open condition so that the flow of welding current between the welding electrodes 24 and 26 is prevented. When a timing signal is received from the timer 10, the reference circuit 12 provides a reference voltage of a preselected magnitude which maintains the weld current control switch 18 in a closed (conductive) condition so that welding current flows between the welding electrodes 24 and 26. The voltage feedback loop causes the current flow through the weld current control switch 18 to assume a level which maintains the voltage between the welding electrodes 24 and 26 at a constant value essentially equal to the preselected magnitude of reference voltage.

The specific circuitry comprising the various blocks of FIG. 1 in accordance with a preferred embodiment of the present invention is illustrated in FIG. 2. As is shown, the timer 10 comprises a monostable multivibrator 32 which is controlled by a variable delay network 34. The monostable multivibrator 32 includes first and second transistors 36 and 38, respectively, having their emitter electrodes directly connected together. The collector electrode of the first transistor 36 is connected to the base electrode of the second transistor 38 by means of a parallel resistor 40 and capacitor 42, while similarly, a parallel resistor 44 and capacitor 46 interconnect the collector electrode of the transistor 38 with the base electrode of the transistor 36. Resistors 48 and 50 interconnect the respective base electrodes of the transistors 36 and 38 with a lead 52 which, in turn, is connected via a bias resistor 54 to a terminal 56 supplying a bias voltage illustrated as +22 volts. It is pointed out, however, that the magnitude and polarity of the bias voltages shown in FIG. 2 are purely illustrative, and in practice will depend upon the particular transistors and other circuit element parameters used. For example, whereas PNP transistors are shown in the circuit of FIG. 2, NPN transistors are equally suitable, and when such transistors are employed, the polarity of the voltages applied to the bias terminals would be opposite from that shown.

The collector electrode of the transistor 36 is connected via a parallel capacitor 58 and resistor 60 to a level of reference potential illustrated as ground, while the collector electrode of the transistor 38 is grounded through a resistor 62. The base electrode of the transistor 36 is connected via a series circuit including the cathode-anode path of a rectifier diode 64, a capacitor 66, and a parallel capacitor 68 and resistor 70 to the ground level. A series resistor 72 and capacitor 74 are connected between the bias lead 52 and ground, while a zener diode 76 is directly connected between the lead 52 and ground, with the cathode of the diode 76 connected to the lead 52. A normally open push-button switch 78 has its contacts connected respectively to the junction 77 between the resistor 72 and the capacitor 74 and to the junction 79 between the capacitors 66 and 68. The switch 78 may be operated manually to establish a short circuit between the junction points 77 and 79 when it is desired to commence a welding operation.

Resistors 80 and 82 are connected in series between the emitter electrode of the transistor 38 and the bias lead 52, while series resistors 84 and 86 interconnect the collector electrode of the transistor 38 with the lead 52. A variable resistor 88 and a variable capacitor 90 are connected in series between the junction between resistors 80 and 82. The resistor 88 and the capacitor 90 constitute the delay circuit 34 which, as will be explained in more detail below, controls the time during which the monostable multivibrator 32 provides an output pulse. Since the time constant of the delay network 34 is variable, the duration of the output pulse from the multivibrator 32, and hence the duration of the welding operation, may be readily controlled. The junction between the resistor 88 and the capacitor 90 is connected to the emitter electrode of a unijunction silicon transistor 92 having a first base electrode 94 connected to ground and having a second base electrode 96 connected to the emitter electrode of the transistor 38.

The output signal from the timer 10, which appears at the collector of the transistor 38, is fed via a lead 98 to the reference circuit 12. In the reference circuit 12 a resistor 100 interconnects the lead 98 with the base electrode of a gating transistor 102, the emitter electrode of which is grounded. A resistor 104 interconnects the collector electrode of the transistor 102 with a terminal 106 providing a bias voltage of —6 volts, for example. A resistor 108 interconnects the bias terminal 106 with the base electrode of the transistor 102, while a resistor 110 is connected between the base of transistor 102 and ground. The positive bias terminal 56 is connected to the collector electrode of the transistor 102 by means of series resistors 112 and 114, with the junction between resistors 112 and 114 being connected to the emitter electrode of the transistor 102 through the anode-cathode path of a rectifier diode 116. A resistor 118 and the anode-cathode path of a rectifier diode 120 are connected in series between the bias terminal 56 and ground.

A potentiometer 122 having a movable tap 124, a resistor 126, and a resistor 128 are connected in series between the anode of the diode 120 and the bias terminal 106. A voltage stabilizing zener diode 130 has its anode connected to the junction between the resistors 126 and 128 and its cathode connected to ground. The movable tap 124 of the potentiometer 122 is connected to the base electrode of an emitter follower regulating transistor 132 having its collector electrode directly connected to the negative bias terminal 106 and its emitter electrode connected to the positive bias terminal 56 through resistor 134. A resistor 136 interconnects the emitter electrodes of the transistors 132 and 102, while the anode-cathode path of a clamping diode 138 is connected between the emitter electrode of the transistor 132 and the junction between resistors 112 and 114. The cathode of the diode 138 is connected to a lead 140 which furnishes the output voltage from the reference circuit 12 to be applied to the comparator 14. The particular level of the reference voltage, and hence the magnitude of the voltage programmed across the welding electrodes 24 and 26, is determined by the setting of the tap 124 on the potentiometer 122 in the manner to be described in more detail below.

The voltage comparator 14 includes a pair of transistors 142 and 144 having their emitter electrodes connected to the positive bias terminal 56 through a common resistor 146. The base electrode of the transistor 142 is connected to the reference voltage lead 140, while the base electrode of the transistor 144 is connected to the feedback lead 30 from the weld head 22. A current limiting variable resistor 148 is connected between the collector electrode of the transistor 144 and the negative bias terminal 106, with a capacitor 150 being connected in parallel with the resistor 148 in order to prevent undesired transients during switching of the transistors 142 and 144. The collector of the transistor 142 is connected directly to the bias terminal 106.

The output signal from the comparator 14 is applied via a lead 152 to the DC amplifier 16 which, as shown, comprises an amplifying transistor 154. It is pointed out, however, that although only a single transistor is shown in the amplifier 16, the amplifier may comprise a plurality of cascaded transistors, with the particular number of transistors used depending upon the degree of amplification desired for the signal on the lead 152. As is shown in FIG. 2, the base and collector electrodes of the amplifier transistor 154 are connected respectively to the lead 152 and to the bias terminal 106. The emitter electrode of the transistor 154, which is grounded through a resistor 156, is connected to a lead 158 on which the output signal from the DC amplifier 16 appears.

The lead 158 is connected to the base electrode of a switching transistor 160 of the weld current control switch 18. Although the weld current switch 18 is shown as comprising a single transistor, it is pointed out that a plurality of transistors connected in parallel may be substituted for the transistor 160 depending upon the level of welding current desired. The collector electrode of the weld current control transistor 160 is connected to the negative terminal of the battery 20 which supplies current to the welding electrodes, the positive terminal of the battery 20 being connected to ground. The battery 20 should be capable of furnishing a large welding current (of the order of hundreds of amperes) at a relatively low voltage (of the order of 1–10 volts). An example of a battery meeting these requirements is a nickel-cadmium storage cell.

The emitter electrode of the transistor 160 is connected to one of the welding electrodes 24, while the other welding electrode 26 is connected to the positive (grounded) terminal of the weld battery 20. In order to provide the comparator 14 with a voltage indicative of the voltage across the welding electrodes 24 and 26, the feedback lead 30 is connected to the welding electrode 24. A small resistor 162 is connected between the emitter electrode of the weld current control transistor 160 and the positive terminal of the battery 20 in order to provide a leakage path for current from the battery 20 when there is no work 28 between the welding electrodes 24 and 26 so that the welding circuitry is stabilized when the welding electrodes are open circuited. On account of the large currents which flow in the leads connected to the welding electrodes 24 and 26, significant losses occur in these leads despite their relatively low resistance. Therefore, the feedback lead 30 and the ground lead are located as close as possible to the respective electrodes 24 and 26 in order to eliminate any measuring error in the welding electrode voltage.

In the operation of the welding control circuit of the present invention, under quiescent conditions the state of the monostable multivibrator 32 in the timer 10 is such that transistor 36 is conductive while transistor 38 is cut off. The capacitor 90 is charged to a voltage sufficient to render the emitter electrode of the unijunction transistor 92 greatly negative with respect to the base electrode 96 so that the unijunction transistor 92 is cut off. The potential at the collector electrode of the transistor 38 is essentially at ground level, and the resulting bias applied to the base electrode of the gating transistor 102 via the resistors 108 and 110 renders the transistor 102 conductive to saturation. The collector electrode of the transistor 102 thus resides at nearly ground potential, and a small current flows from the positive terminal 56 through the resistor 112 and the diode 116 to ground, placing a slightly positive voltage on the lead 140 and on the base of transistor 142 to maintain the transistor 142 in a cut-off condition. Current also flows from the positive terminal 56 through the resistor 118 and then divides, with a portion flowing through the diode 120 to ground and the remainder flowing through the potentiometer 122 and resistors 126 and 128 to the negative terminal 106. The anode of the diode 120 assumes a slightly positive voltage, and the potentiometer tap 124 is set so that a slightly negative voltage is applied to the base of the emitter follower transistor 132. This renders the transistor 132 heavily conductive, placing essentially the potentiometer tap voltage at the anode of the diode 138. Thus, the diode 138 is maintained back biased, with the voltage which appears at its anode being determined by the setting of the potentiometer tap 124.

When the transistor 142 in the comparator 14 is nonconductive, current from the positive bias terminal 56 flows through resistor 146, transistor 144, and resistor 148 to the negative bias terminal 106. The collector electrode of transistor 144 thus assumes a potential of essentially ground level which is applied via the lead 152 to the base electrode of the amplifier transistor 154. The transistor 154 is thus biased to a cut-off condition, placing a voltage at essentially ground potential on the base electrode of the weld current control transistor 160. Hence, transistor 160 is maintained nonconductive, thereby effectively disconnecting the welding electrodes 24 and 26 from the battery 20 to prevent current flow between the welding electrodes 24 and 26 and through the work 28 to be welded. In this condition essentially no voltage is developed between the welding electrodes 24 and 26, and the voltage applied via the feedback lead 30 to the base electrode of the comparator transistor 144 is essentially zero. Thus, the emitter electrode of the transistor 144 is biased positive with respect to the base, maintaining the transistor 144 heavily conductive.

When it is desired to commence a welding operation, the work 28 to be welded is inserted between the welding electrodes 24 and 26, and the push-button switch 78 on the timer 10 is pressed to close the circuit between the junction points 77 and 79. A positive voltage from the terminal 56 is thus applied to the base of the transistor 36 to render the transistor 36 nonconductive. The resultant decreasing potential at the collector electrode of the transistor 36 is applied to the base electrode of the transistor 38 to place the transistor 38 in a conductive condition and thereby change the state of the multivibrator 32. The potential at the collector electrode of the transistor 38 thus rises, and the capacitor 90 in the timing network 34 commences to discharge through the timing resistor 88. The rising potential at the collector electrode of the transistor 38 is applied via the coupling resistor 100 to the base electrode of the gating transistor 102, rendering the base electrode of the transistor 102 positive with respect to the emitter and thereby cutting off the transistor 102. The resulting cessation in current flow through the transistor 102 causes its collector potential to become sufficiently negative so that a negative potential is applied to the lead 140. The diode 138 then becomes conductive and clamps the negative voltage on the lead 140 to essentially the voltage at its anode, as determined by the setting of the potentiometer tap 124. Since the voltage on the lead 140 represents the desired voltage across the welding electrodes 24 and 26, it will be apparent that the magnitude of the weld voltage may be readily adjusted simply by varying the setting of the potentiometer tap 124. It is further pointed out that the inclusion of the emitter follower transistor 132 improves the regulation of the back bias on the clamping diode 138, because if the transistor 132 were omitted and the anode of the diode 138 connected directly to the potentiometer tap 124, changes in the conductive condition of the diode 138 could change the loading on the potentiometer 122 and thereby vary the clamp level of the voltage applied to the lead 140. However, the emitter follower transistor 132 insures that the anode voltage of the diode 138 remains constant.

When the reference voltage on the lead 140 changes from a slightly positive level to a negative level determined by the setting of the potentiometer tap 124, due to the cutting off of the gating transistor 102, the transistor 142 is rendered conductive. The resultant increase in current flow through the common emitter resistor 146 for the transistors 142 and 144 causes a lower potential to be applied to the emitter electrode of the transistor 144 to reduce the current flow through the transistor 144. The potential at the collector electrode of the transistor 144 changes in a negative direction, and this negative going potential is applied to the base of the amplifier transistor 154 to render the transistor 154 conductive. The resultant current flow through the emitter resistor 156 of the transistor 154 applies a negative voltage to the base of the current control switching transistor 160 to render the transistor 160 conductive. A current path is thus established for the flow of welding current from the battery 20 through the welding electrode 26, the work elements 28, the welding electrode 24, and the emitter-collector path of transistor 160, thereby commencing the welding of the elements 28.

During the flow of welding current through the welding electrodes 24 and 26 and the work 28, a negative voltage equal to the voltage between the welding electrodes 24 and 26 is applied via the feedback lead 30 to the base electrode of the comparator transistor 144. The difference between the voltage on the reference lead 140 and the voltage on the feedback lead 30 is reflected in the relative levels of current conduction of the comparator transistors 142 and 144. As long as the magnitude of the reference voltage on the lead 140 exceeds the magnitude of the feedback voltage on the lead 30, current flow through the transistor 144 decreases, causing the flow of welding current through the transistor 160 to increase. Similarly, if the magnitude of the feedback voltage becomes greater than that of the reference voltage, current flow through the transistor 144 increases, resulting in a decreased flow of welding current through the transistor 160. Thus, the feedback functions to control the current flow through transistor 144 to maintain an essentially constant voltage across the welding electrodes 24 and 26 of a magnitude equal to that of the reference voltage on the lead 140.

During the welding operation, the capacitor 90 in the delay network 34 discharges through the timing resistor 88, causing the potential at the emitter electrode of the unijunction transistor 92 to rise. A trigger point is eventually reached at which the potential between the emitter electrode and the base electrode 96 of the unijunction transistor 92 has decreased sufficiently so that the emitter-base path of the unijunction transistor 92 conducts current which commences to recharge the capacitor 90. Current is thus diverted from the transistor 38 to the unijunction transistor 92, reducing the current flow through the transistor 38 and causing the potential at the collector electrode of the transistor 38 to decrease. The resultant decrease in voltage applied to the base electrode of the transistor 36 renders the transistor 36 conductive, causing its collector potential to increase. This increase in collector potential of the transistor 36 is, in turn, applied to the base electrode of the transistor 38 to cut off the transistor 38, resetting the multivibrator 32 to its original state in which the transistor 36 is conductive and the transistor 38 is cut off. When the multivibrator 32 reverts to its original state the remainder of the circuit is returned to its aforementioned quiescent condition with the transistor 102 conductive, the transistor 142 nonconductive, the transistor 144 conductive, and the transistors 154 and 160 nonconductive. When the transistor 160 is returned to its cutoff condition, welding current from the battery 20 is again prevented from flowing through the welding electrodes 24 and 26 and the work 28, thereby ending the welding operation.

Since the circuit is reset upon the triggering of the unijunction transistor 92, and the triggering of the unijunction transistor is determined by the discharge time for the capacitor 90, it will be apparent that by varying the time constant of the delay circuit 34 the duration of the interval during which weld current switching transistor 160 is conductive may be readily varied. Control of the time constant of the delay circuit 34 may be accomplished by varying either the resistance of resistor 88 or the capacitance of capacitor 90, or both. Thus, the duration of the high current, constant voltage welding pulses provided by the circuit of the present invention may be readily controlled.

Although the present invention has been shown and described with reference to a particular embodiment, nevertheless various changes and modifications obvious to a person skilled in the art to which the invention pertains are deemed to be within the spirit and scope of the invention as set forth in the appended claims.

What is claimed is:
1. A welding control circuit comprising: first and second welding electrodes; a battery; a weld current control transistor having an emitter electrode, a base electrode, and a collector electrode; said emitter electrode being directly connected to said first welding electrode; said collector electrode being connected to one terminal of said battery; another terminal of said battery being connected to said second welding electrode; timing means for generating a timing signal of preselected duration; reference means responsive to said timing means for providing a reference voltage of predetermined magnitude during the duration of said timing signal; feedback means for providing a feedback voltage indicative of the voltage between said first and second welding electrodes; comparator means for comparing said reference voltage with said feedback voltage and for providing a control signal indicative of the difference between said reference voltage and said feedback voltage; and means for applying said control signal to said base electrode to maintain said transistor conductive of current and thereby establish a current path between said battery and said welding electrodes during the duration of said timing signal.

2. A welding control circuit according to claim 1 wherein a resistor is connected between said first and second welding electrodes.

3. A welding control circuit comprising: first and second welding electrodes; a battery; a weld current control transistor having an emitter electrode, a base electrode, and a collector electrode; said emitter electrode being directly connected to said first welding electrode; said collector electrode being connected to one terminal of said battery; another terminal of said battery being connected to said second welding electrode; feedback means for providing a feedback voltage indicative of the voltage between said first and second welding electrodes; comparator means for providing a control voltage indicative of the difference between a reference voltage and said feedback voltage; means for applying said control voltage to said base electrode; timing means for generating a timing signal of a preselected duration; reference means responsive to the absence of said timing signal from said timing means for maintaining said reference voltage at a first magnitude such that said control transistor is nonconductive of current and responsive to the presence of said timing signal from said timing means for maintaining said reference voltage at a second magnitude such that said control transistor is conductive of current to such degree that the magnitude of said voltage between said first and second welding electrodes is maintained essentially equal to said second magnitude.

4. A welding control circuit according to claim 3 wherein a resistor is connected between said first and second welding electrodes.

5. A welding control circuit comprising: first and second welding electrodes; a battery, a weld current control transistor having an emitter-collector path and a base electrode; said emitter-collector path and said battery being connected in series between said first and second welding electrodes; feedback means for providing a feedback voltage indicative of the voltage between said first and second welding electrodes; comparator means for providing a control voltage indicative of the difference between a reference voltage and said feedback voltage, said comparator means including first and second transistors having their emitter electrodes connected together, impedance means interconnecting said emitter electrodes with a first bias terminal, conductive means interconnecting the collector electrode of said first transistor with a second bias terminal, a resistor and a capacitor connected in parallel between said second bias terminal and the collector electrode of said second transistor, means for applying said reference voltage to the base electrode of said first transistor, means for applying said feedback voltage to the base electrode of said second transistor, and means connected to the collector electrode of said second transistor for obtaining said control voltage; means for applying said control voltage to said base electrode of said weld current control transistor; timing means for generating a timing signal of a preselected duration; reference means responsive to the absence of said timing signal from said timing means for maintaining said reference voltage at a first magnitude such that said control transistor is nonconductive of current and responsive to the presence of said timing signal from said timing means for maintaining said reference voltage at a second magnitude such that said control transistor is conductive of current to such degree that the magnitude of said voltage between said first and second welding electrodes is maintained essentially equal to said second magnitude.

6. A welding control circuit comprising: first and second welding electrodes; a battery; a weld current control transistor having an emitter-collector path and a base electrode; said emitter-collector path and said battery being connected in series between said first and second welding electrodes; feedback means for providing a feedback voltage indicative of the voltage between said first and second welding electrodes; comparator means for providing a control voltage indicative of the difference between a reference voltage and said feedback voltage; means for applying said control voltage to said base electrode of said weld current control transistor; timing means for generating a timing signal of a preselected duration; reference means responsive to the absence of said timing signal from said timing means for maintaining said reference voltage at a first magnitude such that said control transistor is nonconductive of current and responsive to the presence of said timing signal from said timing means for maintaining said reference voltage at a second magnitude such that said control transistor is conductive of current to such degree that the magnitude of said voltage between said first and second welding electrodes is maintained essentially equal to said second magnitude; said reference means comprising a transistor having a collector electrode resistively coupled to a first bias terminal, an emitter electrode coupled to a second bias terminal, and a base electrode coupled to said timing means, a first diode coupled between said collector and emitter electrodes, a second diode coupled between said emitter electrode and a third bias terminal, a potentiometer coupled between said second bias terminal and the electrode of said second diode coupled to said third bias terminal, said potentiometer having a movable tap, and a third diode having one electrode coupled to said collector electrode and to said comparator means and having another electrode coupled to said movable tap, whereby the position of said movable tap determines said second magnitude of said reference voltage.

7. A welding control circuit comprising: first and second welding electrodes; a battery; a weld current control transistor having an emitter-collector path and a base electrode; said emitter-collector path and said battery being connected in series between said first and second welding electrodes; feedback means for providing a feedback voltage indicative of the voltage between said first and second welding electrodes; comparator means for providing a control voltage indicative of the difference between a reference voltage and said feedback voltage; means for applying said control voltage to said base electrode of said weld current control transistor; timing means for generating a timing signal of a preselected duration; reference means responsive to the absence of said timing signal from said timing means for maintaining said reference voltage at a first magnitude such that said control transistor is nonconductive of current and responsive to the presence of said timing signal from said timing means for maintaining said reference voltage at a second magnitude such that said control transistor is conductive of current to such degree that the magnitude of said voltage between said first and second welding electrodes is maintained essentially equal to said second magnitude; said reference means comprising a gating transistor having a collector electrode resistively coupled to a first bias terminal, an emitter electrode coupled to a second bias terminal, and a base electrode coupled to said timing means, first and second resistors coupled in series between said collector electrode and a third bias terminal, a third resistor having one terminal coupled to said third bias terminal, first and second diodes coupled in series in opposite polarity between the other terminal of said third resistor and the junction between said first and second resistors, the junction between said first and second diodes being coupled to said second bias terminal, an emitter follower transistor having a base electrode and having an emitter electrode resistively coupled to said second and to said third bias terminals and a collector electrode coupled to said first bias terminal, variable resistance means coupled between said other terminal of said third resistor and the base electrode of said emitter follower transistor, a clamping diode coupled between the emitter electrode of said emitter follower transistor and the junction between said first and second resistors, and means coupled to the junction between said first and second resistors for obtaining said reference voltage.

References Cited
UNITED STATES PATENTS

| | | | |
|---|---|---|---|
| 394,892 | 12/1888 | Thomson | 219—108 |
| 2,848,595 | 8/1958 | Van Sciver | 219—110 X |
| 2,981,884 | 4/1961 | Tighe | 323—22 |
| 3,068,350 | 12/1962 | Archer | 219—110 |
| 3,173,078 | 3/1965 | Farnsworth | 323—22 X |
| 3,237,088 | 8/1966 | Karp et al. | 323—22 |
| 2,341,042 | 3/1966 | Rosenfeld et al. | 323—22 |

ANTHONY BARTIS, *Primary Examiner.*

RICHARD M. WOOD, *Examiner.*

B. A. STEIN, *Assistant Examiner.*